US009269070B2

(12) United States Patent
Sreenivasan et al.

(10) Patent No.: US 9,269,070 B2
(45) Date of Patent: Feb. 23, 2016

(54) EPHEMERAL COMMUNICATION

(75) Inventors: Sankar Sreenivasan, Bolingbrook, IL (US); Venkat Gopikanth, Long Grove, IL (US)

(73) Assignee: Tata Consultancy Services Limited, Mumbai (IN)

( * ) Notice: Subject to any disclaimer, the term of this patent is extended or adjusted under 35 U.S.C. 154(b) by 584 days.

(21) Appl. No.: 13/428,190

(22) Filed: Mar. 23, 2012

(65) Prior Publication Data
US 2013/0254408 A1 Sep. 26, 2013

(51) Int. Cl.
G06F 15/16 (2006.01)
G06Q 10/10 (2012.01)
H04L 12/18 (2006.01)
G06Q 50/00 (2012.01)

(52) U.S. Cl.
CPC ............. *G06Q 10/10* (2013.01); *G06Q 50/01* (2013.01); *H04L 12/1813* (2013.01)

(58) Field of Classification Search
CPC . H04L 12/1818; H04L 67/14; H04L 12/1813; G06Q 10/1093; H04W 4/10; H04W 84/08; H04W 76/005
USPC ........... 726/7; 707/706; 705/1; 709/206, 204, 709/227; 379/202.01; 718/100; 455/518, 455/456.1, 456.5; 370/260, 261
See application file for complete search history.

(56) References Cited

U.S. PATENT DOCUMENTS

| 7,031,700 | B1 * | 4/2006 | Weaver ............... H04L 12/1818 455/418 |
| 2004/0187109 | A1 * | 9/2004 | Ross et al. .................... 718/100 |
| 2005/0186970 | A1 * | 8/2005 | Yates ..................... H04W 4/10 455/456.5 |
| 2006/0114843 | A1 * | 6/2006 | Dssouli et al. ................ 370/260 |
| 2007/0286101 | A1 * | 12/2007 | Gagne ................ H04L 12/1818 370/260 |
| 2008/0117839 | A1 * | 5/2008 | Raju ................... H04L 12/1813 370/261 |
| 2008/0300944 | A1 * | 12/2008 | Surazski et al. .................... 705/8 |
| 2008/0318610 | A1 * | 12/2008 | Bhaskaran et al. ........... 455/518 |
| 2009/0240516 | A1 * | 9/2009 | Palestrant ......................... 705/1 |
| 2010/0017371 | A1 * | 1/2010 | Whalin et al. .................... 707/3 |
| 2010/0306317 | A1 * | 12/2010 | Serr ..................... G06Q 10/107 709/205 |
| 2011/0029622 | A1 * | 2/2011 | Walker et al. ................. 709/206 |
| 2011/0041173 | A1 * | 2/2011 | Kurtzig et al. ..................... 726/7 |
| 2011/0142221 | A1 * | 6/2011 | Tofighbakhsh et al. .. 379/202.01 |
| 2011/0185025 | A1 * | 7/2011 | Cherukuri et al. ............ 709/206 |
| 2011/0270926 | A1 * | 11/2011 | Boyd et al. .................... 709/204 |
| 2012/0095977 | A1 * | 4/2012 | Levin et al. ................... 707/706 |
| 2012/0158848 | A1 * | 6/2012 | Hession et al. ............... 709/204 |
| 2013/0143587 | A1 * | 6/2013 | Williams et al. ........... 455/456.1 |
| 2014/0304350 | A1 * | 10/2014 | Rana et al. .................... 709/206 |

* cited by examiner

Primary Examiner — Dustin Nguyen
(74) Attorney, Agent, or Firm — Banner & Witcoff, Ltd.

(57) ABSTRACT

In an embodiment, method(s) and system(s) for providing ephemeral communication is described herein. In an implementation, the method may include determining one or more request keywords associated with a request received from a requesting terminal. The request may be intended for initiating communication. The method may further include transmitting, based on the one or more request keywords, a notification to each of a plurality of target terminals over a communication network for joining a communication group. The method may also include initiating the communication between the requesting terminal and at least one target terminal from the plurality of target terminals. The communication may be initiated upon receiving an acceptance notification from the at least one target terminal to join the communication group.

11 Claims, 2 Drawing Sheets

EPHEMERAL COMMUNICATION

TECHNICAL FIELD

The present subject matter relates, in general, to ephemeral communication, and in particular, to ephemeral communication between users.

BACKGROUND

Various communication devices, such as mobile phones, hand-held tablets, and computers, are widely used in daily communication. Users of such communication devices can exchange ideas and opinions with other users by creating online communities on various online portals. The online communities usually allow communication between users who know each other. In an example, an online community can take the form of an information system where anyone can post content, such as on bulletin board. In another example, the online community can be one where only a restricted number of users can initiate posts, such as Weblogs. Such online communities are generally created through professional and social networking portals, and may generally include known users who share similar interests.

To create the online communities on a networking portal, the user is first requested to register with the networking portal. While registering with the networking portal, the user can create a profile by providing personal information, such as name, location, and hobbies. Once the profile is created, the user can log on to the networking portal and create various online communities. To log on to the networking portal, the user is usually authenticated when the user attempts to access the networking portal. For example, for authentication, the user is required to provide credentials, such as log-in id and password, every time the user intends to create or access already created online communities of the networking portal.

SUMMARY

This summary is provided to introduce concepts related to ephemeral communication between users, which are further described below in the detailed description. This summary is neither intended to identify essential features of the claimed subject matter nor is it intended for use in determining or limiting the scope of the claimed subject matter.

In an embodiment, method(s) and system(s) for providing ephemeral communication is described herein. In an implementation, the method may include determining one or more request keywords associated with a request received from a requesting terminal. The request may be intended for initiating communication. The method may further include transmitting, based on the one or more request keywords, a notification to each of a plurality of target terminals, over a communication network, for joining the communication group. The method may also include initiating communication between the requesting terminal and at least one target terminal from the plurality of target terminals. The communication may be initiated upon receiving an acceptance notification from the at least one target terminal to join the communication group.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
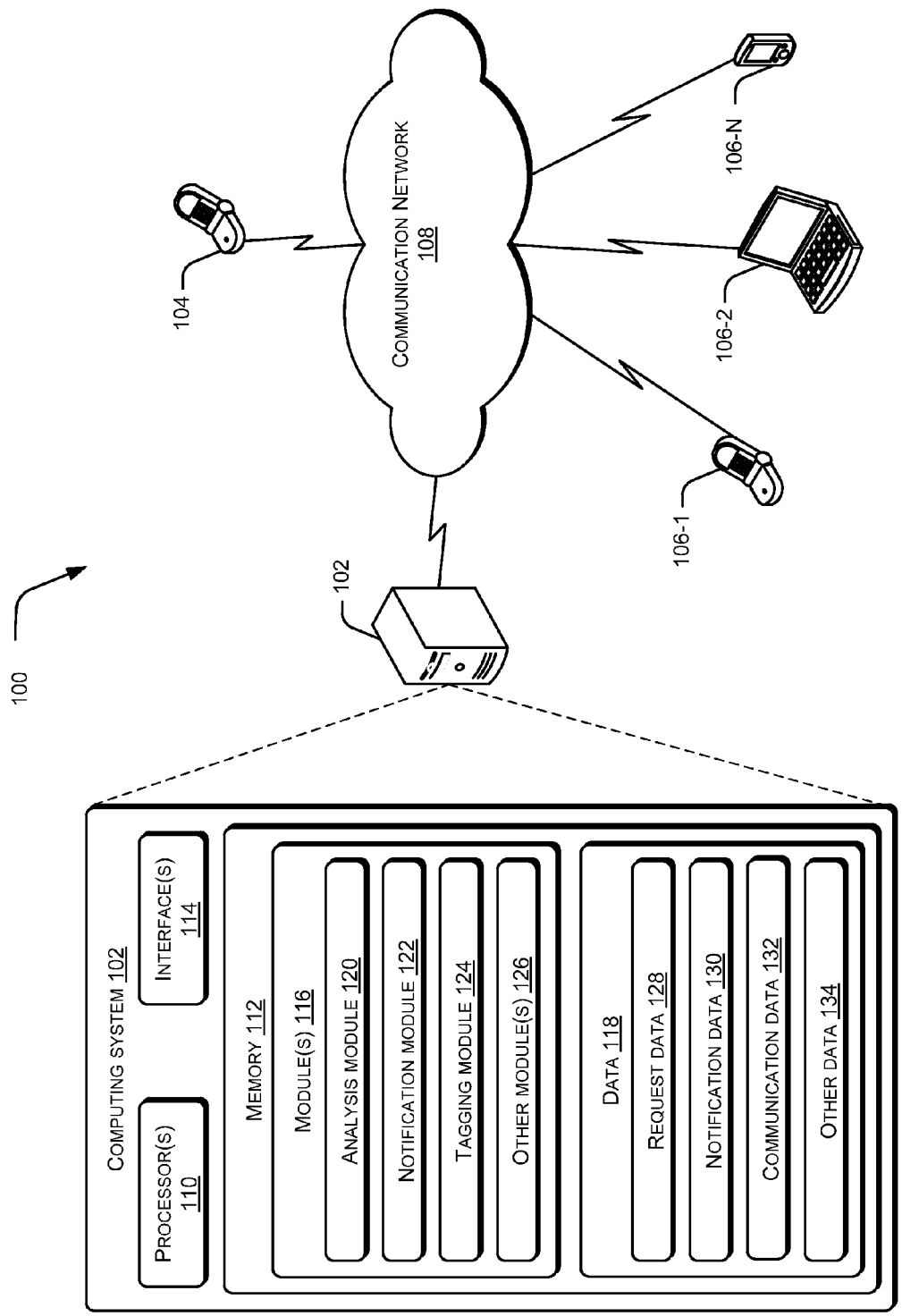
FIG. 1 illustrates a network environment implementation of an ephemeral interaction system for ephemeral communication, in accordance with an embodiment of the present subject matter.

Conventionally, user interactions are achieved through portals, such as social networking portals and professional networking portals, and users can communicate with each other over a network servicing the networking portals. Further, certain activities, such as sending messages to other users are also allowed to the users of a networking portal. To send messages to the other users, the users may be required to usually register with the networking portal. Once registered, the users can access the networking portal by providing credentials, such as login id and password. The identity of each user accessing the networking portal is usually authenticated before access of the networking portal is provided to the user.

Generally, the portals can be used as an information system where, for example, a user can post content in the form of queries on a question and answer (Q&A) forum or in the form of blogs on a bulletin board. In a scenario where the portals serve as the Q&A forum, the user may post a query and seek answers to the query. Additionally, the user may create an online community, related to the query, on the portal which can then be joined by other users associated with the user through the portal. The user can, therefore, submit various queries and articles on the online community and receive inputs from the other associated users. However, the other members or users of the online community may not access the portal all the time, and the user may have to wait to get a reply. In said scenario, if the user is urgently seeking an answer to the query, a reply at later point of time may not be of use to the user. Therefore, such an online community allows users to interact with each other but not in real-time. Further, to check if there are any comments on the blogs posted by the user, the user either has to remain logged-on to the portal or frequently log on to the portal to check for updates. However, providing authentication details for logging on to the portal each time is inconvenient for the users.

In another scenario, if the user needs certain information relating to a topic, the user can either create a new community or search for other existing communities related to the topic. When the user creates the new community, the user can invite individuals, say from a contact list, to join the new community. In this scenario, waiting for the individuals from the contact list to join the new community and then participating in the activities of the new community may again take time. Additionally, as mentioned earlier, the user may also create and post a query on the Q&A forum and invite responses and inputs on the query relating to the topic. However, in such case, the user cannot be sure if any of the added users are going to reply immediately. Waiting for the responses on the query may be inconvenient for the user, and in certain cases, the responses may not be useful by the time the other users reply to the query. Moreover, as would be understood from the foregoing description, in conventional networking portals, information can only be exchanged between users associated with each other through the respective portals.

The present subject matter relates to ephemeral communication between unknown users. As the name suggests, ephemeral communication can be understood as a short-term interaction between two or more users. In most cases, the ephemeral interactions may not be recorded for later reference. The ephemeral communication may include telephone conversations, text messages, chat room sessions, streaming audio, streaming video, and other electronic forms of communication.

According to an implementation, a requesting terminal may send a request to an ephemeral interaction system over a communication network for initiating an ephemeral interaction. In an implementation, the request may be associated with one or more request keywords. Further, for facilitating the ephemeral interaction, the ephemeral interaction system may facilitate a user to create an ephemeral communication group through the requesting terminal. Further, the ephemeral interaction system, in turn, may transmit notifications, based on the request, to a plurality of target terminals associated with the ephemeral interaction system and invite the target terminals to join the ephemeral communication group. The target terminals may choose to accept the invitation and join the ephemeral communication group or may decline the invitation. Those target terminals joining the ephemeral communication group to participate in the ephemeral interaction with the requesting terminal can send an acceptance notification to the ephemeral interaction system. With receipt of the acceptance notifications, the ephemeral interaction system can introduce the target terminals into the ephemeral communication group and allow interaction between the requesting terminal and the target terminals. Further, the ephemeral communication group may terminate automatically when all members quit the ephemeral communication group.

In an example, the request sent by the requesting terminal to the ephemeral interaction system may be a question to which an answer is sought in real-time. For example, the requesting terminal may seek company for travelling from one place to another, or to know whether somebody is interested in sharing a snow blower for a nominal fee or not.

As mentioned above, the request from the requesting terminal may be received by the ephemeral interaction system. The ephemeral interaction system may be configured to parse the request and determine the one or more request keywords associated with the request. Also, the ephemeral interaction system may be configured to identify a location of the requesting terminal as well as the target terminals. Further, in an implementation, based on the one or more request keywords and the location, the ephemeral interaction system may provide a list of existing ephemeral communication groups that may be related to the request and may be in proximity to the requesting terminal.

In said implementation, the requesting terminal may choose to select one of the existing ephemeral communication groups from the list. The ephemeral interaction system may then add the requesting terminal to the selected ephemeral communication group, and facilitate interaction of the requesting terminal with the target terminals that may be members of that ephemeral communication group.

In another implementation, the requesting terminal may not join any of the existing ephemeral groups as provided in the list and may request the ephemeral interaction system to create a new ephemeral communication group. Accordingly, the ephemeral interaction system may create the new ephemeral communication group and add the requesting terminal to the group. Additionally, the ephemeral interaction system can identify a plurality of target terminals for sending notifications for joining the ephemeral communication group based on the request keywords associated with the request. In said implementation, the plurality of target terminals may be pre-registered with the ephemeral interaction system. To register with the ephemeral interaction system, each of the plurality of target terminals may be subscribed to services of the ephemeral interaction system, for example, by providing a list of interests or by selecting one or more categories of interest provided by the ephemeral interaction system at the time of registration.

Further, in response to the notification, the plurality of target terminals may choose to accept the notification and join the ephemeral communication group, or to decline the notification sent by the ephemeral interaction system. Thereafter, each target terminal accepting to join the ephemeral communication group may send an acceptance notification to the ephemeral interaction system, based on which the ephemeral interaction system may initiate ephemeral communication between the requesting terminal and the accepting target terminals. Once interaction between the requesting terminal and the plurality of target terminals is complete, the ephemeral communication group may automatically terminate when all members leave the group. Accordingly, the ephemeral interaction system provides ephemeral communication between the requesting terminal and the plurality of target terminals that can be initiated on a need basis.

As mentioned herein, the ephemeral interaction system may automatically transmit notifications to the plurality of target terminals for enabling short-term interactions between the requesting terminal and the plurality of target terminals in real-time. The plurality of target terminals may not belong to a contact list of the requesting terminal, and therefore, the ephemeral interaction system may facilitate short-term interaction between unknown users. Further, in an implementation, the ephemeral interaction system of the present subject matter may facilitate need-based communication between terminals having similar interests. For example, the ephemeral interaction system may enable a requesting terminal to seek answers to a query, such as where to find a snow blower on rent, by creating the ephemeral communication group at any point of time. In addition, as the plurality of target terminals are pre-registered with the ephemeral interaction system, they do not have to share their login credentials while accepting a notification and therefore the ephemeral interaction system enables secure communication between terminals.

Accordingly, the ephemeral interaction system of the present subject matter may facilitate creation of ephemeral communication groups, for enabling ephemeral interactions between unknown terminals. Additionally, the plurality of target terminals may receive the notifications at all times and provide an acceptance notification to the request, without the users of either of the two terminals having to authenticate the access. Such a capability facilitates a convenient and real-time interaction between the requesting terminal and the plurality of target terminals.

These and other advantages of the present subject matter would be described in greater detail in conjunction with the following figures. While aspects of described systems and methods for providing ephemeral communication between unknown users can be implemented in any number of different computing systems, environments, and/or configurations, the embodiments are described in the context of the following exemplary system(s).

FIG. 1 illustrates a network environment 100 implementing an ephemeral interaction system 102 for achieving ephemeral communication, in accordance with an embodiment of the present subject matter. The ephemeral interaction system 102 may be configured to facilitate ephemeral communication between unknown terminals in the network environment 100. The ephemeral interaction system 102 may be connected to and may interact with a requesting terminal 104, and a plurality of target terminals 106-1, 106-2 . . . 106-N collectively referred to as target terminals 106 and individually referred to as a target terminal 106. The ephemeral communication may refer to short-term interaction between the requesting terminal 104 and at least one of the target terminals 106.

In an implementation, the target terminals 106 may need to register with the ephemeral interaction system 102 in advance, i.e., before achieving ephemeral communication as part of one or more ephemeral communication groups, to be able to receive notifications from the ephemeral interaction system 102. To register, the target terminals 106 may create a profile with a set of subscription keywords that may be of interest to the target terminals 106. For example, the registration of the target terminals 106 may include associating with at least one subscription keyword. In an example, the subscription keyword may be at least one keyword from the one or more request keywords associated with the request sent by the requesting terminal 104. In another example, the subscription keyword may be semantically associated with the one or more request keywords associated with the request sent by the requesting terminal 104. Once the registration is completed, the set of subscription keywords may be considered for matching with ephemeral communication groups. Accordingly, the set of subscription keywords may act as tokens for identifying the target terminals 106 of interest. In said implementation, the registration may be a one time registration, which implies that the target terminals 106 need not to register again with the ephemeral interaction system 102 while joining an ephemeral communication group.

In another implementation, during the registration, the target terminals 106 may provide details about a location thereof along with the subscription keywords to the ephemeral interaction system 102. The registration details, such the subscribed keywords and the location of the target terminals 106 may be stored in a repository (not shown) within the ephemeral interaction system 102, such as other data 134. It will be understood that although the repository is shown to reside within the ephemeral interaction system 102, the repository may also be provided external to the ephemeral interaction system 102.

The ephemeral interaction system 102 may be implemented in a variety of computing systems, such as a laptop computer, a desktop computer, a notebook, a workstation, a mainframe computer, a server, and a network server. The requesting terminal 104 and the target terminals 106, on the other hand, may include, without limitation, desktop computers, hand-held devices, laptops or other portable computers, tablet personal computers, network computers, mobile phones, multi-media enabled phones, and smart phones.

The ephemeral interaction system 102, the requesting terminal 104, and the target terminals 106 may communicate with each other over a communication network 108. The communication network 108 may be a wireless or a wired network, or a combination thereof. In an example, the communication network 108 may be implemented as a telecommunication network. In said example, the communication network 108 may be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), IP-based network, Public Switched Telephone Network (PSTN), and Integrated Services Digital Network (ISDN). Depending on the technology, the communication network 108 may include various network entities, such as gateways, routers; however, such details have been omitted for the sake of brevity.

As mentioned earlier, the location of the requesting terminal 104 and one or more target terminals 106, say target terminal 106-1, may be determined by the ephemeral interaction system 102 for allowing short-term interactions therebetween. In a scenario, the requesting terminal 104 and the one or more target terminals 106, say target terminal 106-1, may be in their respective home location networks. The home location may refer to a region where a terminal, such as a communication device may be registered. In another scenario, the requesting terminal 104 and the one or more target terminals 106 may be outside their home location networks, i.e., may be on roaming in a visitor network. The above mentioned scenarios may facilitate the ephemeral interaction system 102 to identify the location of the requesting terminal 104 and may accordingly identify the target terminals 106 that may be in proximity to the requesting terminal 104 and may also have subscribed to one or more request keywords associated with the request sent by the requesting terminal 104.

In another example, the communication network 108 may be implemented as a combination of the telecommunication network and a computer network. According to said example, the computer network can be implemented as one of the different types of networks, such as intranet, local area network (LAN), wide area network (WAN), and the internet. The communication network 108 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), to communicate with each other. Further, the communication network 108 may include a variety of network devices, including routers, bridges, servers, computing devices, storage devices. In yet another example, the communication between the ephemeral interaction system 102, and the requesting terminal 104 and the target terminals 106 may be partly achieved through General Packet Radio Service (GPRS) or Bluetooth.

In an implementation, the ephemeral interaction system 102 includes a processor(s) 110 coupled to a memory 112. The ephemeral interaction system 102 further includes interface(s) 114, for example, for communicating with the requesting terminal 104 and the target terminals 106. Further, the interface(s) 114 may include a variety of software and hardware interfaces, for example, interfaces for peripheral device(s), such as a keyboard, a mouse, an external memory, and a printer. Additionally, the interface(s) 114 may enable the ephemeral interaction system 102 to communicate with other devices, such as web servers and external repositories. The interface(s) 114 may also facilitate multiple communications within a wide variety of networks and protocol types, including wired networks, for example, LAN, cable, etc., and wireless networks, such as WLAN, cellular, or satellite. For the purpose, the interface(s) 114 may include one or more ports.

The processor(s) 110 may be implemented as one or more microprocessors, microcomputers, microcontrollers, digital signal processors, central processing units, state machines, logic circuitries, and/or any devices that manipulate signals based on operational instructions. Among other capabilities, the processor(s) 110 may be configured to fetch and execute computer-readable instructions stored in the memory 112.

The memory 112 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the memory 112 includes module(s) 116 and data 118.

The module(s) 116 include, for example, an analysis module 120, a notification module 122, a tagging module 124, and other module(s) 126. The other module(s) 126 may include programs or coded instructions that supplement applications or functions performed by the ephemeral interaction system 102.

The data 118 may include request data 128, notification data 130, communication data 132, and other data 134. The other data 134, amongst other things, may serve as a repository for storing data that is processed, received, or generated as a result of the execution of one or more modules in the module(s) 116. Although the data 118 is shown internal to the ephemeral interaction system 102, it may be understood that the data 118 can reside in an external repository (not shown in the figure), which may be coupled to the ephemeral interaction system 102. The ephemeral interaction system 102 may communicate with the external repository through the interface(s) 114 to obtain information from the data 118.

As mentioned earlier, the ephemeral interaction system 102 is configured to facilitate ephemeral interactions between the requesting terminal 104 and the one or more target terminals 106. The ephemeral communication may include, but are not limited to, telephone conversations, text messages, chat room sessions, streaming audio, streaming video, and other electronic forms of communication. In most cases, the ephemeral interactions are not available for later reference. The ephemeral interactions may be achieved by creation of ephemeral communication groups.

The requesting terminal 104 may send a request to the ephemeral interaction system 102 for starting an ephemeral communication group. The request may be associated with one or more request keywords that may be related to a topic on which the requesting terminal 104 wants to start the ephemeral communication group. Based on the one or more request keywords, the ephemeral interaction system 102 may provide a list of pre-existing ephemeral communication groups to the requesting terminal 104. The requesting terminal 104 may either select an existing group from the list or may ignore the list and create the ephemeral communication group. The ephemeral interaction system 102 may send automatic notifications to a plurality of target terminals 106. Accordingly, the ephemeral interaction system 102 may facilitate the requesting terminal 104 to initiate ephemeral interactions with one or more interested target terminals 106 in real-time.

According to an implementation of the present subject matter, the analysis module 120 may receive the request from the requesting terminal 104. In an example, the one or more request keywords may be part of a question or a word string in the request. In an implementation, the one or more request keywords may be associated with the request by the requesting terminal 104 while sending the request. As mentioned above, the request may be intended for creating and initiating discussion within the ephemeral communication group. Further, the ephemeral communication group may be initiated by the ephemeral interaction system 102 when the requesting terminal 104 wants to obtain information about a topic, obtain answer to a query, seek help, for chatting with other terminals having similar interests, and the like. Further, the requesting terminal 104 may associate one or more request keywords with the request, for example, the one or more request keywords may represent a topic based on which the ephemeral interactions may take place between the requesting terminal 104 and the target terminals 106. Such topics may include, but are not limited to, name of a user of the requesting terminal 104, an organization name, such as "XYZ Semiconductors" for communicating with various employees of the same organization, or a query, such as "Anybody interested to share a drive till Chicago?", for which the requesting terminal 104 seeks an answer.

Once the request is received, the analysis module 120 parses the request to determine the one or more request keywords associated with the request. As understood, according to said implementation, the requesting terminal 104 may send the one or more request keywords associated along with the request. In said implementation, the request may be associated with a location of the requesting terminal 104. Accordingly, the analysis module 120 parses the request to identify the location of the requesting terminal 104. For example, the analysis module 120 may identify whether the requesting terminal 104 is in the home location or roaming. The location of the requesting terminal 104 may facilitate in identification of the target terminals 106 that may be in vicinity of the requesting terminal 104, as will be explained later. The analysis module 120 may also store the request, the one or more request keywords associated with the request, and the location of the requesting terminal 104 in the request data 128.

In another implementation, the analysis module 120 may identify the one or more request keywords based on a last ephemeral group creation request received from the requesting terminal 104, if any. In an example, if the requesting terminal 104 regularly sends requests to the ephemeral interaction system 102 for creating ephemeral communication groups, the analysis module 120 may identify history of the requesting terminal 104 based on the request data 128. Based on the history associated with the requesting terminal 104, the analysis module 120 may provide the requesting terminal 104 with various options of initiating the ephemeral communication group. The various options may include providing the requesting terminal 104 with a choice of selecting one or more request keywords from last 10 ephemeral communication groups created by the requesting terminal 104, associating the one or more request keywords that were used by the requesting terminal 104 in the last ephemeral interactions, and the like.

In another example, the analysis module 120 may suggest keywords that may be similar in context to the one or more request keywords defined by the requesting terminal 104. As mentioned above, the analysis module 120 may suggest the keywords based on prior ephemeral communication groups that were created by the requesting terminal 104. It will also be understood that the one or more request keywords may be included in the request sent by the requesting terminal 104 or may be associated at later point in time by the analysis module 120 based on identification of the requesting terminal 104.

In an implementation, based on the determined request keywords associated with the request, the notification module 122 may identify various ephemeral communication groups that may be pre-existing and may be related to the one or more request keywords defined by the requesting terminal 104. In said implementation, the notification module 122 may identify a closest match for the requesting terminal 104. The closest match may refer to the pre-existing ephemeral communication groups that may be based on the maximum number of request keywords associated with the requesting terminal 104. In an example, the notification module 122 may generate a list of the identified pre-existing ephemeral communication groups in such a manner that the ephemeral communication group including members that have subscribed to most of the request keywords associated with the request is placed at a top position. A member of the existing ephemeral communication group in this case, may refer to one or more target terminals 106, which may have joined the existing ephemeral communication group.

In another implementation, the notification module 122 may identify the pre-existing ephemeral communication groups based on the proximity, of the target terminals 106, to the requesting terminal 104. For example, in case of the target terminals 106 lying in the same network as the requesting terminal 104, for example, home network or visitor network of the requesting terminal 104, such target terminals 106 can be given a higher preference than those outside the network on which the requesting terminal 104 is operating. In said implementation, the list may include the identified pre-existing ephemeral communication groups in a hierarchical order, such that the ephemeral communication group having most members located in proximity to the requesting terminal 104 is placed at a top position in the list. Thereafter, the notification module 122 may provide the list of the existing ephemeral communication groups to the requesting terminal 104. In an embodiment, the requesting terminal 104 may select an existing ephemeral communication group from the list provided by the notification module 122 for joining the existing ephemeral communication group. In yet another implementation, the notification module 122 can identify the ephemeral groups based on a combination of closest match based on the request keywords and the proximity of the target terminals 106.

Once the existing ephemeral communication group is selected by the requesting terminal 104, the notification module 122 may transmit a notification to each member of the existing ephemeral communication group. The members of the existing ephemeral communication group may not be previously associated with the requesting terminal 104. In an example, the notification may refer to a request for allowing the requesting terminal 104 to join the existing ephemeral communication group.

Further, one or more target terminals 106 may accept the notification for joining the ephemeral communication group. The one or more target terminals 106 accepting the notification received from the notification module 122 may be interchangeably referred as interested target terminals 106. The notification module 122 may, subsequently, receive an acceptance notification from interested target terminals 106. Based on the acceptance notifications, the notification module 122 may facilitate initiation of ephemeral interactions between the requesting terminal 104 and the one or more target terminal 106 of the existing ephemeral communication group.

Upon receiving the acceptance notification from the one or more target terminals 106 of the existing ephemeral communication group, the notification module 122 may allow the requesting terminal 104 to join the existing ephemeral communication group. Once the requesting terminal 104 has joined the existing ephemeral communication group, the requesting terminal 104 may interact with each of the one or more target terminals 106 of the existing ephemeral communication group.

In another scenario, the requesting terminal 104 may decline to join any of the existing ephemeral communication groups as listed by the ephemeral interaction system 102. The requesting terminal 104 may thereafter request the ephemeral interaction system 102 to create a new ephemeral communication group and include the requesting terminal 104 in the new group. The requesting terminal 104 may provide a name to the new ephemeral communication group, for example, by associating one or more request keywords with the new ephemeral communication group.

In an implementation, when the requesting terminal 104 requests the ephemeral interaction system 102 to create the new ephemeral communication group based on the one or more request keywords, the notification module 122 may send a registration notification to the requesting terminal 104. The registration notification, in accordance with this implementation, may refer to a request sent to the requesting terminal 104 by the notification module 122 prompting the requesting terminal 104 to subscribe to the one or more request keywords associated with the ephemeral communication group. The requesting terminal 104 may choose to subscribe one request keyword, a combination of request keywords, all request keywords, or none of the one or more request keywords. Based on the subscription of the request keywords, the requesting terminal 104 may be notified by the notification module 122 about creation of other ephemeral groups that may be associated with one or more of the subscribed request keywords.

In said implementation, the notification module 122 may identify one or more target terminals 106 from the plurality of target terminals 106, based on the one or more request keywords associated with the request. As described above, the plurality of target terminals 106 may be already subscribed to the ephemeral interaction system 102, and, in an example, may have listed at least one keyword from the one or more request keywords associated with the request in a list of interests. For example, if the requesting terminal 104 provides a name "XYZ Semiconductors Las Vegas" to the new group, the notification module 122 may identify all those target terminals 106 that may have subscribed to subscription keywords "XYZ", "Semiconductor", "Las Vegas", and a combination thereof. Accordingly, in said example, the notification module 122 may identify the target terminals 106 based on the interests to which the target terminals 106 have subscribed and on the request keywords associated with the request.

Thereafter, in said implementation, the notification module 122 may automatically send notifications to the identified target terminals 106 upon receiving confirmation from the requesting terminal 104 for creating the new ephemeral communication group. The notification may refer to an invitation for joining the ephemeral communication group created by the ephemeral interaction system 102. In an implementation, the notification module 122 can be configured to transmit the notification based on the keywords subscribed to by the requesting terminal 104 during the registration step. In another implementation, the notification module 122 may be configured to transmit notifications to those identified target terminals 106 which are in proximity of the requesting terminal 104. As mentioned earlier, the requesting terminal 104 may become the first member of the ephemeral communication group.

In said implementation, one or more identified target terminals 106 may show interest in the notification and may accept the same. Accordingly, acceptance notifications may be sent to the notification module 122 by the interested target terminals 106. The acceptance notifications received from the interested target terminals 106 may be collated by the ephemeral interaction system 102 and pushed to the requesting terminal 104. Further, the notification module 122 may be configured to store data related to the notifications being sent to the identified target terminals 106, acceptance notifications received from the interested target terminals 106, list of the interested target terminals 106 joining the ephemeral communication group, in the notification data 130.

According to an implementation, in both the scenarios described above, based on the acceptance notifications received from the various interested target terminals 106, the notification module 122 may be configured to create a list of all members, such as the requesting terminal 104 and the target terminals 106, joining the ephemeral communication group. In an example, the notification module 122 may rank the members of the ephemeral communication group chronologically, based on when the acceptance notification is received from the member. In another example, the ranking of the members may be based on the number of strings of the subscription keywords matching with the request keywords provided by the requesting terminal 104. Say, the requesting terminal 104 may have associated four request keywords with the request for creation of the new ephemeral communication group. As mentioned earlier, the notification module 122 may identify the target terminals 106 that have subscribed to at least one of the four request keywords. The notification module 122 may place a member having all four request keywords subscribed first in the list and the last member may have least number of matching request keywords. In yet another example, the notification module 122 may rank the members of the ephemeral communication group based on their proximity to the requesting terminal 104. For example, the member nearest to the requesting terminal 104 may be ranked first in the list. Further, the list of members of the new ephemeral communication group may include the requesting terminal 104 as well as the interested target terminals 106 that have joined the ephemeral group.

Further, according to an implementation, when a member wants to leave the ephemeral communication group, the member can send a termination request to the notification module 122 through the target terminal 106 or, in case the member is the requesting user, through the requesting terminal 104. The notification module 122 may receive the termination request and parse the request, for example, for determining the syntax of the termination request. Upon acceptance of the termination request, the member may leave the ephemeral communication group, and the notification module 122 can accordingly remove the leaving member from the list of members. Further, when the notification module 122 approves the termination requests of all participating members of the ephemeral communication group, and the list of members is empty, the ephemeral communication group may terminate. Accordingly, the ephemeral communication group may facilitate a short-term interaction between the requesting terminal 104 and the interested target terminals 106, and may terminate once a discussion is over and the requesting terminal 104 and the interested target terminals 106 quit the ephemeral communication group.

The aforementioned features of the present subject matter are described with reference to the following examples. Considering an example, assume a user, Tom, is stranded at Cleveland airport and last flight to Chicago has been cancelled. However, Tom may like to reach Chicago within few hours and may therefore decide to look for other options to reach Chicago. In such a case, Tom may be interested in sharing the cost of the journey with another traveler who has already rented a vehicle for travelling to Chicago. Accordingly, Tom may request the ephemeral interaction system 102 and create the ephemeral communication group named "Cleveland Chicago AA949" and may post a query "Anybody interested to share a drive to Chicago?" In the meantime, another user, Rob may also want to drive back till Chicago and may request the ephemeral interaction system 102 and send the request keywords "Cleveland Chicago". As explained earlier, the notification module 122 may provide a list of existing ephemeral communication groups to Rob, based on the request keywords. As will be understood the list may include the ephemeral communication group "Cleveland Chicago AA949" created by Tom. The ephemeral interaction system 102 may facilitate Rob to join the above mentioned group and communicate with Tom. Once the interaction is over and Rob and Tom log-out from the communication groups, respectively, the group is terminated.

In another example, on a snowy day, a user, Randy may require a heavy snow blower to clean the drive way, and would like to enquire if another user in the vicinity, say on the same street, can share a snow blower for a nominal fee. Accordingly, Randy may request the ephemeral interaction system 102 to create an ephemeral communication group. Further, Randy may provide a name "Hinsdale snowy day Flower Street" to the group and may post a question "Can somebody share a snow blower for a nominal fee?" through the newly created ephemeral communication group. In accordance with the present subject matter, another user, Tim, who may have subscribed for keywords "Hinsdale Flower Street", may receive a notification through the notification module 122. The notification may be an invitation for Tim to join the new ephemeral communication group. If interested, Tim may accept the notification to join the group and may communicate with Randy.

In an implementation, the tagging module 124 may receive feedback from various terminals that may participate in ephemeral communication between the requesting terminal 104 and the interested target terminals 106. In said embodiment, the terminals may be the requesting terminal 104 or the target terminal 106. For example, the requesting terminal 104 may provide feedback about members of the ephemeral communication group and vice-versa. Based on the feedback obtained, the tagging module 124 may credit reward points to the terminals. Additionally, the tagging module 124 may be configured to tag the requesting terminal 104 based on the feedback provided by the target terminals 106. Alternatively, the target terminals 106 may be tagged by the tagging module 124 based on the feedback provided by the requesting terminal 104.

In an example, every time the requesting terminal 104 creates or joins an ephemeral communication group, the tagging module 124 may ask for feedback from other members of the ephemeral communication group. The requesting terminal 104 may accumulate the reward points that may be obtained after each communication session. Further, the tagging module 124 may tag the requesting module 104 as a "domain expert", when the requesting terminal 104 has accumulated a predetermined minimum number of reward points. Accordingly, before joining the ephemeral communication group started by the requesting terminal 104, the target terminals 106 may check the number of reward points allocated to the requesting terminal 104. In an implementation, when an ephemeral communication group is initiated for a topic for which a domain expert has also subscribed, the ephemeral interaction system 102 may give preference to those terminals that have been tagged as domain experts.

In accordance with an implementation, the notification module 122 may be configured to alert the requesting terminal 104 about activities in other ephemeral communication groups that may be pertaining to same context as that of the ephemeral communication group of the requesting terminal 104. The information notification across different ephemeral communication groups may be based on commonalities in the request keywords between the different ephemeral communication groups. For example, a first user (requesting terminal 104) may create a first ephemeral communication group (G1) based on a request keyword "Laptop" and may have members A, B, C, D (target terminals 106). Further, a second user may create a second ephemeral communication group (G2) based on request keywords "laptop bags backpack". While creating G2, the second user may be informed about the existence of G1 by the notification module 122, as the keyword "Laptop" is common between G1 and G2. However, the second user may be interested in laptop bags and therefore, may continue to create G2. Since there is some commonality between G1 and G2, both the groups will be notified about the existence of other group on periodic basis. Accordingly, the first and the second users may switch to other groups as and when required.

In another implementation, for creating an alert, in an implementation, the notification module 122 may monitor the ephemeral interactions taking place in the ephemeral communication group created by the requesting terminal 104. For example, the notification module 122 can parse text of chat messages being exchanged during the communication in the communication group. Based on the monitoring, the notification module 122 may alert the requesting terminal 104 about other existing ephemeral communication groups of similar context.

Considering an example, where a first ephemeral communication group may be created by a requesting terminal A. The first ephemeral communication group may have a topic "smartphones" that may imply as the request keywords. Based on the request keywords associated with the first ephemeral communication group, the ephemeral interaction system 102 may transmit notifications to a plurality of target terminals. Further, target terminals B, C, D and E of the plurality of target terminals may be interested to join the first ephemeral communication group. In said example, a second ephemeral communication group may be created by a requesting terminal F and may include target terminals I, J, K, and L as members. The second ephemera communication group may have a topic "handheld communication devices". As will be understood that the second ephemeral communication group is similar in context to the first ephemeral communication group. In accordance with the present subject matter, the notification module 122 of the ephemeral interaction system 102 may alert the requesting terminal A about the second ephemeral communication group.

In an implementation, based on the alerts provided by the notification module 122, the requesting terminal 104 may either merge the ephemeral communication group with one of the existing communication groups or may abandon the current group. In an example, the requesting terminal 104 may take the above mentioned action if any of the existing ephemeral communication groups has more activity than the ephemeral communication group. The notification module 122 may be configured to store information obtained from monitoring the ephemeral communication as communication data 132.

Further, in the above example, upon receiving alerts regarding other similar ephemeral communication groups, the requesting terminal A may merge the first ephemeral communication group with the second ephemeral communication group. For example, the requesting terminal A may join the second ephemeral communication group along with members B, C, D, and E of the first ephemeral communication group. In another implementation, the requesting terminal A may request the requesting terminal F to join the first ephemeral communication group along with the other members of the second ephemeral communication group. In yet another implementation, the requesting terminal A may suggest the members of the first ephemeral communication group to switch to the second ephemeral communication group. In this case some of the members, such as terminals A, B, and D may switch the communication groups. The requesting terminal A may then abandon the first ephemeral communication group.

As will be understood from the foregoing description, the ephemeral interaction system 102 facilitates unknown users to communicate with each other by creating ephemeral communication groups. Further, the above explained examples also indicate that the ephemeral interactions may be initiated on a need basis. In addition, the ephemeral interaction system 102 may automatically send notifications to the registered target terminals 106 about creation of any related ephemeral communication group. The ephemeral communication groups may be terminated automatically once all participants of the communication group have left the group. Accordingly, the present subject matter may facilitate creation of ephemeral communication groups for a specific reason between unknown users. The ephemeral interaction system 102 of the present subject matter may enable even unknown users to communicate with each other and enhance their knowledgebase. Further, the members of such ephemeral communication groups may not be required to always stay with a specific group.

Figure 2:
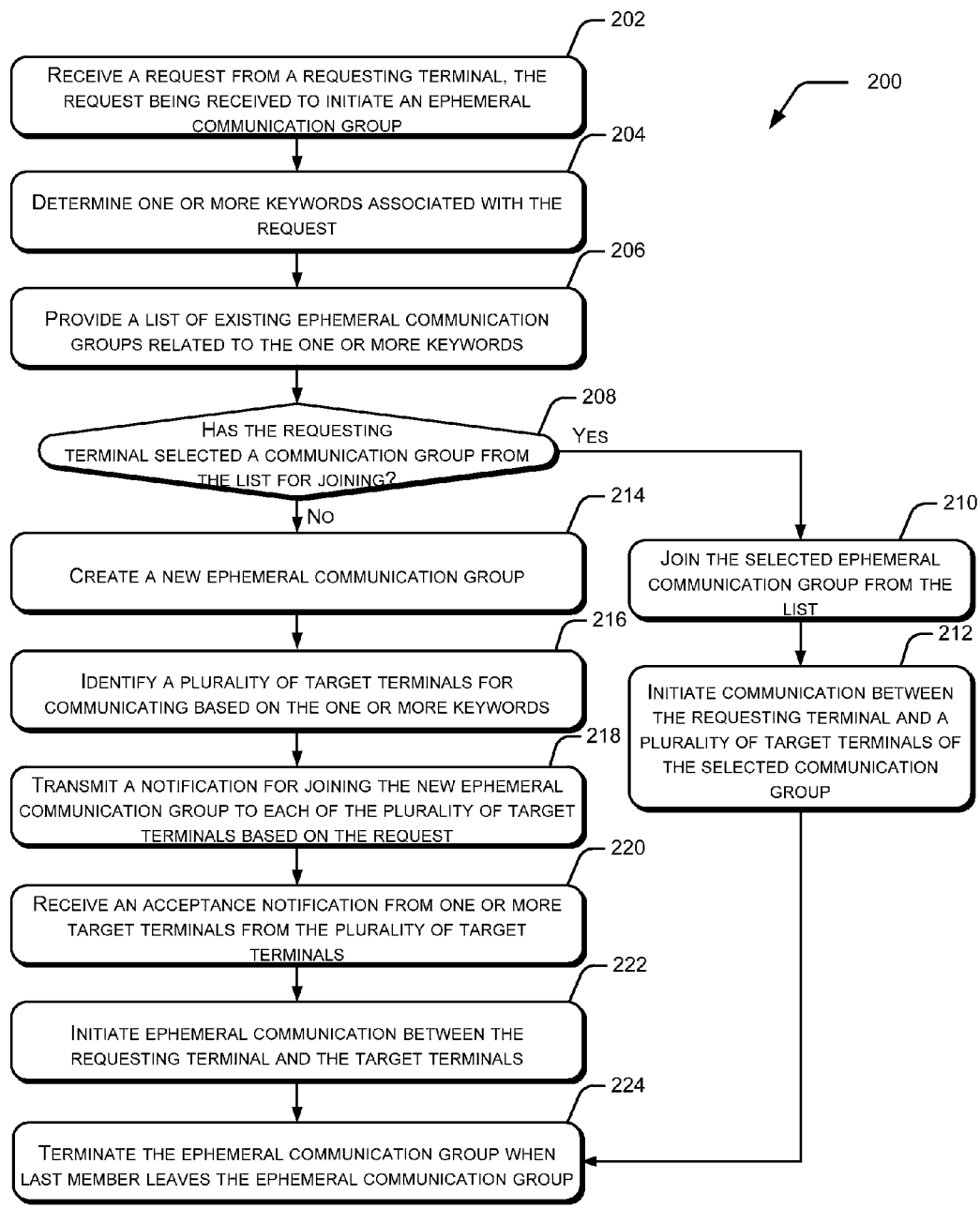
FIG. 2 illustrates an exemplary method for ephemeral communication, in accordance with an embodiment of the present subject matter.

FIG. 2 illustrates an exemplary method 200 of initiating ephemeral communication in an ephemeral interaction system 102, in accordance with an embodiment of the present subject matter. The method 200 may be described in the general context of computer executable instructions. Generally, computer executable instructions can include routines, programs, objects, components, data structures, procedures, modules, functions that perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200, or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to the method 200 depicted in FIG. 2, at block 202, a request is received from a requesting terminal, such as the requesting terminal 104. The request may be received by the analysis module 120 of the ephemeral interaction system 102. Further, the request may be associated with one or more request keywords and a location of the requesting terminal 104.

In an implementation, the request may refer to an ephemeral communication group creation request. Ephemeral communication relates to short-term communication between users. The ephemeral communication may refer to telephone conversations, text messages, chat room sessions, streaming audio, streaming video, and other electronic forms of communication. The ephemeral interactions may not be recorded for later reference. Further, the ephemeral communication group may be created by the requesting terminal 104 when the requesting terminal 104 wants to obtain information about a topic, obtain answer to a query, seek help, for chatting with other terminals having similar interests, and the like.

At block 204, one or more request keywords associated with the request may be determined, say by the analysis module 120, upon receipt of the request sent by the requesting terminal 104. In an example, the one or more request keywords can be part of a question or a word string in the request. In an implementation, the one or more request keywords may be associated with the request by the requesting terminal 104. As mentioned above, the request may be intended for initiating the ephemeral communication group. In an implementation, the request may be a question for which an answer is sought by the requesting terminal 104 in real-time. For example, the request can include a question to find out company for sharing a drive.

In another implementation, the analysis module 120 may also be configured to identify the location of the requesting terminal 104. For example, the analysis module 120 may parse the request to identify whether the requesting terminal 104 is in a home location or is roaming. In an implementation, the ephemeral interaction system 102 may identify a present location, such as the home location or a visitor location of the terminals. Based on the location, the target terminals 106 in proximity of the requesting terminal 104 may be identified.

At block 206, based on the determined request keywords associated with the request, the notification module 122 may identify various ephemeral communication groups that may be pre-existing and may be related to the one or more request keywords defined by the requesting terminal 104. The notification module 122 may identify an appropriate group from amongst an existing ephemeral communication group, based on proximity to the requesting terminal 104. The notification module 122 may generate a list of existing ephemeral communication groups and provide the list to the requesting terminal 104.

The requesting terminal 104 may choose to join any of the existing ephemeral communication group from the list or may ignore the list and may create a new ephemeral communication group. At block 208, it is determined whether the requesting terminal 104 has selected any of the existing ephemeral communication group from the list for joining or not.

If the requesting terminal 104 has selected an existing ephemeral communication group ('yes' path from block 208), the requesting terminal 104 may join the selected ephemeral communication group at block 210. In such a case, the notification module 122 may transmit a notification to each member of the existing ephemeral communication group. The members of the existing ephemeral communication group may not be previously associated with the requesting terminal 104. The notification may refer to a request for allowing the requesting terminal 104 to join the existing ephemeral communication group. In an implementation, one or more target terminals 106 may accept the notification to join the ephemeral communication group. The notification module 122 may accordingly receive an acceptance notification from the interested target terminals 106 of the existing ephemeral communication group. Upon receiving the acceptance notification from the target terminals 106 of the existing ephemeral communication group, the notification module 122 may enable the requesting terminal 104 to join the existing ephemeral communication group.

As mentioned earlier, for the target terminals 106 to be able to receive notifications from the notification module 122, each of the target terminals 106 may need to register with the ephemeral interaction system 102 in advance. The registration of the target terminals 106 may imply subscription of at least one keyword from the one or more request keywords associated with the request sent by the requesting terminal 104. Further, location of a home location of the target terminals 106 may be determined during registration. Once registered with the ephemeral interaction system 102, the target terminals 106 may be provided with tokens. In said implementation, the registration may be a one time registration, which implies that the target terminals 106 need not to register again with the ephemeral interaction system 102 while joining an ephemeral communication group.

At block 212, the requesting terminal 104 may initiate ephemeral interaction with the target terminals 106 of the existing ephemeral communication group selected from the list. Once the ephemeral interaction is over, the ephemeral communication group is terminated as explained later with reference to block 224.

On the other hand, if is was determined that the requesting terminal 104 did not join any of the existing ephemeral communication group from the list ('no' path from block 208), the requesting terminal 104 may request the ephemeral interaction system 102 to create a new ephemeral communication group and include the requesting terminal 104 in the new group (block 214). Accordingly, the requesting terminal 104 may become a first member of the new ephemeral communication group. Further, the requesting terminal 104 may provide a name to the new ephemeral communication group, such as by associating one or more request keywords with the group.

At block 216, a plurality of target terminals 106 may be identified by the notification module 122 on the basis of the one or more request keywords associated with the new ephemeral communication group. As explained above, the plurality of target terminals 106 may have pre-registered with the ephemeral interaction system 102. For example, the plurality of target terminals 106 may have listed at least one keyword from the one or more request keywords associated with the request in a list of interests. Accordingly, in said example, the notification module 122 can identify the target terminals 106 based on the interests to which the target terminals 106 have subscribed and on the request keywords associated with the request.

Once identified, the notification module 122 may automatically transmit a notification to each of the identified target terminals 106, at block 218. The notification may include a request for joining the new ephemeral communication group. In an implementation, one or more identified target terminals 106 may show interest in the notification and may accept the same.

At block 220, an acceptance notification may be received from the interested target terminals 106. According to an implementation, the notification module 122 may receive the acceptance notifications from the interested target terminals 106. The acceptance notifications received from the interested target terminals 106 may be collated by the ephemeral interaction system 102 and pushed to the requesting terminal 104. The notification module 122 may be configured to store data related to the notifications being sent to the identified target terminals 106, acceptance notifications received from the interested target terminals 106, list of the interested target terminals 106 joining an ephemeral communication group, as the notification data 130.

At block 222, the notification module 122 may facilitate initiation of the ephemeral interactions between the requesting terminal 104 and the interested target terminals 106.

Further, at block 224, the ephemeral communication group between the requesting terminal 104 and the target terminals 106 may be terminated. In an implementation, the notification module 122 may be configured to maintain a list of the participating members of the ephemeral interactions. It will be understood that the ephemeral interactions may either be between the requesting terminal 104 and the interested target terminals 106 of the ephemeral communication group or between the requesting terminal 104 and the interested target terminals 106 of the existing ephemeral communication group.

According to an implementation, when a member decides to leave the ephemeral communication group, the member can send a termination request to the notification module 122 through the target terminal 106 or, in case the member is the requesting user, through the requesting terminal 104. The notification module 122 may receive the termination request and parse the request. When the notification module 122 accepts the termination notification, the member may leave the ephemeral communication group. Accordingly, the notification module 122 may remove the leaving member from the list and when the list of members is empty, the ephemeral communication group may terminate.

As will be understood from the foregoing description, the ephemeral interactions, achieved according to the present subject matter, facilitate the members of the ephemeral communication group to interact in real-time. For example, a user, Andrew may be a supervisor in an automotive company ABC. Further, another user, Bill may be a new General Manager in ABC having a vast knowledge of trouble shooting of the maintenance related issues in assembly division. Bill may have subscribed with the ephemeral interaction system 102 for various subscription keywords associated with solution of problems related to assembly and production areas. As mentioned above, the location of Bill may also be registered with the ephemeral interaction system 102. In a scenario, Andrew may get stuck with a problem for which none of the team members have an experience. Accordingly, Andrew may request the ephemeral interaction system 102 and create an ephemeral communication group called "ABC plant Assembly wheel balancer machine". As mentioned above, Bill has subscribed to one of the request keywords "Assembly" as provided by Andrew. Additionally, as Bill is in the same location as Andrew, the notification module 122 may automatically send a notification to Bill for joining the ephemeral communication group created by Andrew.

Bill may be interested in the new group and may accept the notification. Upon acceptance of the notification by Bill, the notification module 122 may receive an acceptance notification from Bill and send the acceptance notification to Andrew. The ephemeral interaction system 102 may therefore enable Bill and Andrew to initiate ephemeral interactions in real-time and get a solution to the problem. Further, when both Bill and Andrew leave the ephemeral communication group, the notification module 122 may terminate the group.

In another example, a user, Mike, from a manufacturing department of a company "XYZ" may be attending a convention in Las Vegas. Mike may be aware that various other employees from different departments of his company are also attending the convention. In said example, to interact with other employees, Mike may send a request to the ephemeral interaction system 102 through the requesting terminal 104 for creating an ephemeral communication group. The ephemeral interaction system 102 may create an ephemeral communication group and add Mike to that group. Further, Mike may provide a name "XYZ Semiconductor Las Vegas" to the ephemeral communication group. In said example, the name of the group may imply the one or more request keywords. The notification module 122 may identify target terminals 106 related to the one or more request keywords and transmit notifications to the identified target terminals 106. The identified target terminals 106 may not be associated with the requesting terminal 104.

In furtherance to the above example, another user, Tom, of the XYZ company may have subscribed to one or more of the above mentioned keywords. Accordingly, Tom may receive notification from the notification module 122 for joining the ephemeral communication group. When Tom accepts the notification for joining the ephemeral communication group, he may send an acceptance notification to the ephemeral interaction system 102. Accordingly, the notification module 122 may add Tom to the ephemeral communication group and initiate ephemeral interactions between Tom and Mike. When both, Tom and Mike, quit the ephemeral communication group, the ephemeral interaction system 102 terminates the ephemeral communication group. In accordance with the above example, the present subject matter enables short-term communication between users.

Although implementations for ephemeral communication have been described in language specific to structural features and/or methods, it is to be understood that the appended claims are not necessarily limited to the specific features or methods described. Rather, the specific features and methods are disclosed as implementations for achieving ephemeral communication.

We claim:

1. A method comprising:
   determining, by a processor, one or more request keywords and a location associated with a request received from a requesting terminal, wherein the request is intended for initiating a real-time ephemeral communication and wherein the determination is based on parsing the request received from the requesting terminal;
   identifying, by the processor, a plurality of target terminals in proximity to the requesting terminal based on the one or more request keywords, the location associated with the request received from the requesting terminal, and based on at least one subscription keyword associated with each of the plurality of target terminals, wherein the at least one subscription keyword corresponds to one of, at least one keyword from the one or more request keywords, and at least one keyword semantically associated with the one or more request keywords, and wherein the plurality of target terminals are unknown to the requesting terminal;
   transmitting, by the processor, based on the one or more request keywords and the location associated with the request received from the requesting terminal, a notification to each of a plurality of target terminals, over a communication network, for joining an ephemeral communication group;
   receiving an acceptance notification from at least one target terminal to join the ephemeral communication group;
   ranking each member of the ephemeral communication group chronologically based on time at which the acceptance notification is received from the at least one target terminal, number of strings of the at least one subscription keyword matching with the one or more request keywords and proximity of the at least one target terminal with the requesting terminal upon receiving the acceptance notification from the at least one target terminal, wherein the member of the ephemeral communication group comprises the requesting terminal and the at least one target terminal;
   initiating, by the processor, the real-time ephemeral communication between the requesting terminal and the at least one target terminal from the plurality of target

19 terminals, wherein the real-time ephemeral communication is initiated upon ranking each member of the ephemeral communication group chronologically; and terminating, by the processor, the ephemeral communication group when last member leaves the ephemeral communication group, wherein the member includes at least one of the requesting terminal and the at least one target terminal.

2. The method as claimed in claim 1, wherein the plurality of target terminals is selected based on the at least one subscription keyword and a location of the plurality of target terminals with respect to the requesting terminal.

3. The method as claimed in claim 1, wherein the transmitting further comprises providing a list of existing ephemeral communication groups in proximity to the requesting terminal and related to the one or more request keywords associated with the requesting terminal, wherein the requesting terminal is configured to select an existing ephemeral communication group from the list of existing ephemeral communication groups.

4. The method as claimed in claim 1 further comprising merging the ephemeral communication group with at least one of the existing ephemeral communication groups, wherein the merging is based on context of the communication taking place between the requesting terminal and the at least one target terminal of the ephemeral communication group.

5. The method as claimed in claim 1 further comprising tagging a terminal as a domain expert, based on a feedback received from member terminals of the ephemeral communication group.

6. An ephemeral interaction system comprising:
a processor; and
a memory coupled to the processor, the memory comprising:
an analysis module configured to,
obtain a request from a requesting terminal, wherein the request is intended for initiating a real-time ephemeral communication between the requesting terminal and at least one target terminal; and
determine one or more request keywords and a location associated with the request received from the requesting terminal, wherein the one or more request keywords define a context of an ephemeral communication group, wherein the determination is based on parsing the request received from the requesting terminal; and
a notification module configured to,
identify a plurality of target terminals in proximity to the requesting terminal based on the one or more request keywords, the location associated with the request received from the requesting terminal, and based on at least one subscription keyword associated with each of the plurality of target terminals, wherein the at least one subscription keyword corresponds to one of, at least one keyword from the one or more request keywords, and at least one keyword semantically associated with the one or more request keywords, wherein the plurality of target terminals are unknown to the requesting terminal;
transmit notifications to each of the plurality of target terminals for joining the ephemeral communication group based on the one or more request keywords and the location associated with the request received from the requesting terminal;

20 obtain acceptance notifications from the at least one target terminal of the plurality of target terminals to join the ephemeral communication group;
rank each member of the ephemeral communication group chronologically based on time at which the acceptance notification is received from the at least one target terminal, number of strings of the at least one subscription keyword matching with the one or more request keywords and proximity of the at least one target terminal with the requesting terminal upon obtaining the acceptance notifications from the at least one target terminal, wherein the member of the ephemeral communication group comprises the requesting terminal and the at least one target terminal;
initiate the real-time ephemeral communication between the requesting terminal and the at least one target terminal; and
terminate the ephemeral communication group when last member leaves the ephemeral communication group, wherein the member includes one of the requesting terminal and the at least one target terminal.

7. The ephemeral interaction system as claimed in claim 6, further comprising a tagging module configured to,
obtain feedback from number of target terminals joining the ephemeral communication group, wherein the feedback is based on the real-time ephemeral communication between the at least one target terminal and the requesting terminal; and
tag the requesting terminal as a domain expert, based on the feedback received from the at least one target terminal.

8. The ephemeral interaction system as claimed in claim 6, wherein the plurality of target terminals is selected based on the at least one subscription keyword and a location of the plurality of target terminals with respect to the requesting terminal.

9. The ephemeral interaction system as claimed in claim 6, wherein the notification module is further configured to provide a list of existing ephemeral communication groups in proximity to the requesting terminal and related to the one or more request keywords associated with the requesting terminal, wherein the requesting terminal is configured to join any of existing ephemeral communication group from the list.

10. The ephemeral interaction system as claimed in claim 9, wherein the notification module is further configured to,
monitor the communication between the requesting terminal and the at least one target terminal in the ephemeral communication group to determine a context of the real-time ephemeral communication; and
merge the ephemeral communication group with at least one existing ephemeral communication group based on the monitoring.

11. A non-transitory computer-readable medium having embodied thereon a computer program for executing a method for initiating real-time ephemeral communication between a requesting terminal and at least one target terminal, the method comprising:
determining one or more request keywords and a location associated with a request received from the requesting terminal, wherein the request is intended for initiating the real-time ephemeral communication between the requesting terminal and the at least one target terminal, and wherein the determination is based on parsing the request received from the requesting terminal;
transmitting, based on the one or more request keywords and the location associated with the request received from the requesting terminal, a notification to each of a plurality of target terminals over a communication network for joining an ephemeral communication group, wherein the transmitting comprises identifying the plurality of target terminals in proximity to the requesting terminal based on the one or more request keywords, the location associated with the request received from the requesting terminal and based on at least one subscription keyword associated with each of the plurality of target terminals, wherein the at least one subscription keyword corresponds to one of, at least one keyword from the one or more request keywords, and at least one keyword semantically associated with the one or more request keywords, and wherein the plurality of target terminals are unknown to the requesting terminal;

receiving an acceptance notification from at least one target terminal to join the ephemeral communication group;

ranking each member of the ephemeral communication group chronologically based on time at which the acceptance notification is received from the at least one target terminal, number of strings of the at least one subscription keyword matching with the one or more request keywords and proximity of the at least one target terminal with the requesting terminal upon receiving the acceptance notification from the at least one target terminal, wherein the member of the ephemeral communication group comprises the requesting terminal and the at least one target terminal;

initiating the real-time ephemeral communication between the requesting terminal and the at least one target terminal from the plurality of target terminals, wherein the real-time ephemeral communication is initiated upon ranking each member of the ephemeral communication group chronologically; and terminating the ephemeral communication group when last member leaves the ephemeral communication group, wherein the member includes at least one of the requesting terminal and the at least one target terminal.

* * * * *